Patented Nov. 1, 1927.

1,647,805

UNITED STATES PATENT OFFICE.

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT.

METHOD OF TREATING LATEX.

No Drawing. Application filed March 24, 1926. Serial No. 97,024.

This invention relates to a method of treating latex and product thereof, more particularly to a method for producing a concentrated latex of low viscosity, and its product.

In the course of the direct use of latex in the rubber art, various methods have been devised for concentrating and otherwise changing the properties of the latex to adapt it for particular purposes. One method of concentrating the latex is by a heat treatment for the purpose of directly withdrawing moisture therefrom. This results in a concentrated latex which retains all of the solid constituents of the normal latex and which is of considerably increased viscosity. For some purposes, such as spreading, this increased viscosity is of importance, but for other applications it is desirable to have a concentrated latex of a relatively low viscosity, or one free from non-rubber constituents, or both.

Another method of obtaining a concentrated latex is by the use of so-called "creaming", in which materials are added to the latex which, without any heat treatment, will cause the latex to separate into two layers, in one of which the proportion of rubber constituent is greatly increased, while in the other the water and serum constituents, such as proteins, sugars, etc., are at a maximum. By then drawing off the layer containing the increased proportion of rubber globules a concentrated latex may be obtained. Various agents are capable of causing this separation, among which are pectin materials, Irish moss, Karaya, etc. One pectin material as marketed is contained in water as a carrier and is hydrolyzed to a considerable extent. The Irish moss and the Karaya gum are ordinarily prepared in hot water and therefore also are hydrolyzed to a considerable extent, which action also occurs if they are permitted to stand before using. As a result of the use of these hydrolyzed creaming agents, the concentrated latex obtained has a relatively low viscosity as compared with concentrated latex of similar solids content obtained by the heat treatment. Such concentrated latex of low viscosity is of considerable value for certain purposes, among which may be mentioned the making of rubber articles by the deposition of latex on a porous from through which the watery constituents of the latex are withdrawn. In making articles by this method, it is desirable to use a concentrated latex in order to obtain the desired thickness of deposit as quickly as possible, and at the same time this result is assisted by having the latex of low viscosity, which enables its watery constituents to be more quickly withdrawn. An objection to the cold concentrated or creamed latex as prepared by the use of a hydrolyzed creaming agent is that in separating the latex into two layers in the creaming process, it is impossible in practice to avoid the inclusion of an appreciable portion of the rubber constituent as well as the non-rubber ones in the watery layer. When using a normal amount of the hydrolyzed creaming agent, as much as 12 to 14% of the total solids may be removed in the watery layer. This loss of the rubber constituent may be reduced to a considerable extent by using relatively large proportions of the creaming agent, but the amount required of the creaming agent necessarily is so large that it affects the aging value of the rubber produced, and in addition, the creaming agent in such quantity of itself increases the viscosity of the concentrated latex to such an extent that it has no advantage over the heat concentrated latex for purposes where a low viscosity concentrated latex is required.

An object of my invention is to provide an improved method for cold concentrating latex, that is, at ordinary temperatures. Another object is to provide a simple, economical and rapid method for producing a concentrated latex of low viscosity. Still another object is to provide a method for cold concentrating latex so as to retain practically all of the original rubber constituent. A further object is to provide a cold concentrated or creamed latex of low viscosity and containing practically all of its original rubber content.

In carrying out the method, latex of a normal solids content, say 33%, has mixed therewith a relatively small amount of a suitable creaming agent such as dried pectin, Irish moss, Karaya gum, etc., these materials being in a substantially non-hydrolyzed form. As examples of the use of these creaming agents the following are given:

Powdered pectin is prepared in a 3% aqueous solution by rapidly stirring into water at room temperature. The prepared solution is then used at once by adding a sufficient amount of the solution to make .7 part of the powdered pectin to sufficient latex to yield 100 parts rubber. Separation starts in about 30 minutes to one hour, and will be essentially complete in about 30 hours.

When using Karaya gum, it is prepared in the form of a 2% aqueous solution made as in the case of the pectin solution, and sufficient of the solution to make .5 part Karaya gum is added to sufficient latex to yield 100 parts rubber. It is sometimes necessary to slightly heat the Karaya gum when putting in solution as this material disperses and hydrolyzes less readily than pectin. Care should be taken not to carry this too far. Initial creaming starts in from two to five hours and is essentially complete in from 30 to 50 hours, depending upon the thoroughness with which the Karaya gum is distributed in the latex.

When using Irish moss the ordinary commercial moss is leached with cold water to form a 1% solution, and enough of the solution to make from .4 to .6 parts of the Irish moss is added to sufficient latex to yield 100 parts rubber. The creaming or separation proceeds in this case about as with the Karaya gum.

In the creaming operation the latex separates into layers, one containing the rubber constituents, while the other is a watery layer containing a greatly increased proportion of the serum constituents. In the examples above given, the creamed layer contains substantially all of the rubber hydrocarbon, less than ½% of it being carried down into the serum layer, and by slightly increasing the amount of the creaming agent, there will be practically no rubber loss whatever. At a single creaming operation an amount of non-rubber constituents equivalent to between 5 and 6% of the latex solids is carried down into the serum layer. In the examples given, the creamed layer has a concentration of about 50 to 55% solids, but by standing for longer periods, the concentration may reach 60% or even higher. Due to the fact that the creaming agents are substantially not hydrolyzed, a relatively small proportion of them suffices to produce a practically complete separation of the rubber constituents into the creamed layer as above pointed out.

However, the viscosity is higher even than that of a heat concentrated latex containing a similar proportion of solids, and the creamed latex, as obtained, is unsuited for purposes requiring a concentrated latex of low viscosity. The concentrated latex is then heated for a short time at a temperature below the boiling point of water, for instance on a water bath. As an example, a creamed latex of 55% solids, made from non-hydrolyzed creaming agents, can be reduced in viscosity over 20% by two hours treatment in a nearly closed system at 80° C. Such a treatment could not be applied to heat concentrated latex, since in this case there is no creaming agent to hydrolyze, and the heating would more than likely cause an increased viscosity by thickening the protein bodies. It has been found that the relative viscosities of these different types of concentrated latex containing 55% solids are as follows: heat concentrated 100, hydrolyzed pectin 71, non-hydrolyzed pectin 109, non-hydrolyzed pectin heat treated two hours 90. While the heat treatment can be carried out without the addition of a stabilizing agent with no formation of any coagulum and no deterioration in the latex, it is deemed advisable to stabilize the latex previous to the heat treatment by the addition of small amounts of stabilizing agents, such as saponin, or sodium, potassium or other soaps. Instead of subjecting the creamed latex to heat to obtain the hydrolyzing action on the creaming agent, any other suitable method of accomplishing this result may be used, such as letting the creamed latex stand at ordinary temperatures for a considerable length of time. If desired the creaming process above set forth may be repeated one or more times, but owing to the fact as above pointed out that the non-hydrolyzed creaming agents prevent the carrying down of the rubber constituents into the serum layer, each recreaming step merely removes additional amounts of the non-rubber constituents from the creamed latex. By the prior method in which a hydrolyzed creaming agent was used, each recreaming step caused a further loss of the rubber constituent. By my invention a concentrated latex of relatively low viscosity can be obtained at ordinary temperatures with practically no loss of its rubber constituent in the serum. By cold concentration is meant the separation of the watery portion of the latex in liquid form from the portion containing the rubber hydrocarbon, as distinguished from heat concentration in which water is removed from the latex in the form of vapor. However, the creaming or cold concentration method does not preclude moderate warming to assist the creaming operation.

With the detailed disclosure above given, it is obvious that modifications will suggest themselves, and it is not desired to limit the invention otherwise than as set forth in the appended claims.

Having thus described my invention, what I claim and desire to protect by Letters Patent is:

1. A method of treating latex which comprises adding a substantially unhydrolyzed creaming agent to the latex to cause the separation of a thickened layer of creamed latex, withdrawing the creamed latex from the watery serum, and then subjecting the thickened creamed latex to a hydrolyzing action.

2. A method of treating latex which comprises adding a substantially unhydrolyzed creaming agent to the latex to cause the separation of a layer of thickened and concentrated creamed latex, withdrawing said layer, and heating the same at a temperature below 100° C.

3. A method of treating latex which comprises adding a non-hydrolyzed vegetable colloid to the latex to cause the separation of a layer of concentrated and thickened latex, withdrawing said layer, and heating the same at a temperature below 100° C.

4. A method of treating latex which comprises adding to the latex dry pectin in quantities sufficient to cause separation of a layer of high viscosity containing substantially all of the rubber content, withdrawing said layer, and subjecting it to a hydrolyzing action.

5. A method of treating latex which comprises adding to the latex dry pectin in quantities sufficient to cause separation of a layer of high viscosity containing a maximum proportion of the rubber content, withdrawing said layer, and subjecting it to a heat treatment below 100° C.

Signed at New York, in the county of New York, and State of New York, this 19th day of March, 1926.

JOHN McGAVACK.